Figure 1:
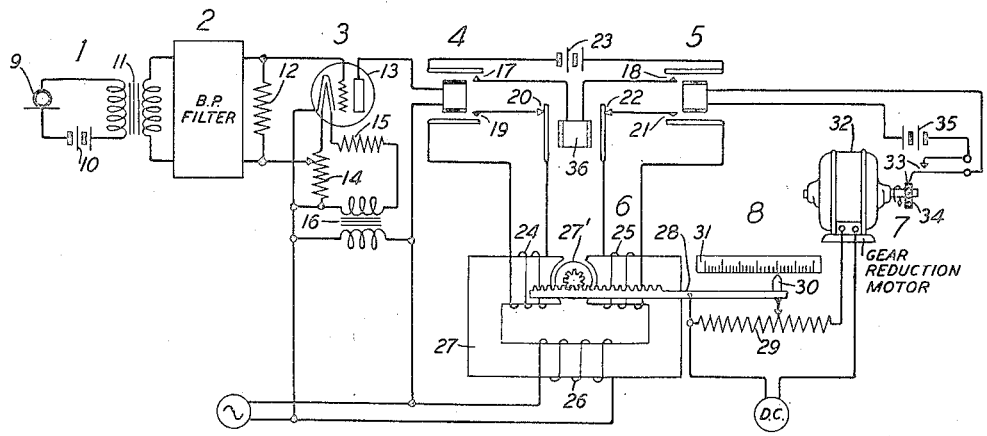

Feb. 17, 1942.   C. A. LOVELL   2,273,532
LOW FREQUENCY INDICATOR AND RECORDER
Filed Dec. 2, 1938

INVENTOR
C. A. LOVELL
BY
G. H. Campbell
ATTORNEY

Patented Feb. 17, 1942

2,273,532

UNITED STATES PATENT OFFICE 2,273,532

LOW FREQUENCY INDICATOR AND RECORDER

Clarence A. Lovell, New York, N. Y., assignor to Bell Telephone Laboratories, Incorporated, New York, N. Y., a corporation of New York Application December 2, 1938, Serial No. 243,623

3 Claims. (Cl. 128—2.05)

This invention relates to a means for measuring low frequency vibrations or undulations.

The object of this invention is to provide a means for continuously indicating or recording low frequency vibrations, undulations or pulses of any nature translatable into an electric pulse and which have frequencies approximating those of heart beats.

The foregoing object is attained in this invention by a combination of apparatus comprising an impulse generating means responsive to the frequency to be measured, a second impulse generating means having a frequency proportional to the speed of a variable speed driving means, a controlling means responsive to the relative impulse frequencies thereof and adapted to maintain synchronism therebetween and an indicating means associated with said control means for indicating the frequency to be measured.

Figure 2:
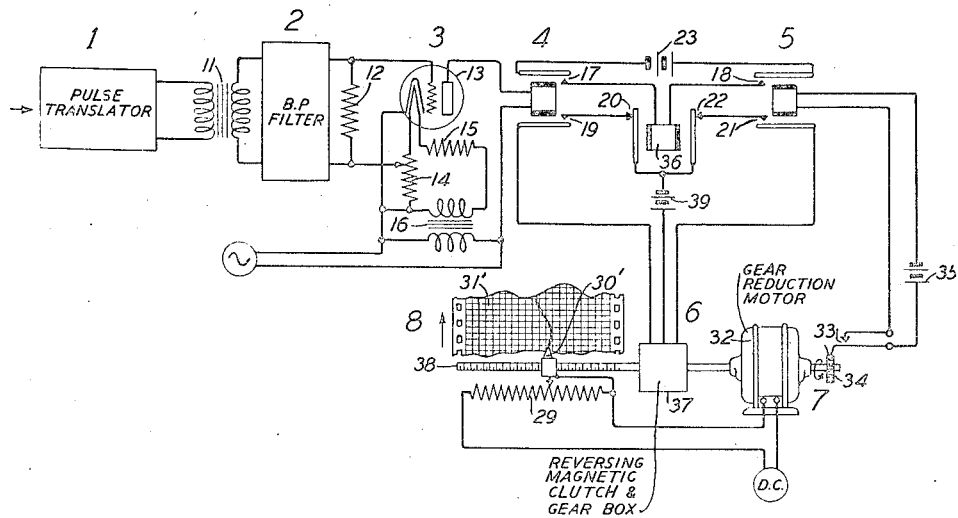

The invention is best illustrated by reference to the drawing in which:

Fig. 1 is a circuit and diagrammatic disclosure of one form of the invention as applied to the continuous indication of a low frequency acoustic pulse or mechanical shock; and Fig. 2 is a similar circuit showing a recording device adapted to continuously record a low frequency pulse.

Referring now to Fig. 1, a pick-up and translating circuit 1 is adapted to pick up the pulse energy and transmit the same as electrical energy to a band-pass filter 2. Filter 2 is designed to pass with maximum energy the frequency which it is desired to indicate. The output of the filter is fed into a gas-filled tube 3 which controls the operation of electromagnetic impulse relay 4. The circuit thus far is so adjusted that relay 4 operates synchronously with the energy pulses received by pick-up circuit 1. A second impulse relay 5 operates with a frequency proportional to the speed of variable speed device 7, here shown as a motor 32. Variable speed control 6 is adapted to so control the speed of motor 7 that relays 4 and 5 operate synchronously as will be explained more in detail later. Indicating means 8 is associated with the speed control means and is adapted to indicate directly the frequency of the incoming pulse picked-up by pick-up circuit 1.

Pick-up circuit 1 is illustrated in the form of a telephone transmitter 9 in circuit with a battery 10 and the primary of a transformer 11. The output of the secondary of transformer 11 is fed into a band-pass filter 2, the operation of which has already been described. Resistor 12 is inserted in the control grid circuit of gas-filled tube 13 to insure proper bias control of the grid. The plate, filament and grid bias supply for this tube are all derived from an alternating current power source. A transformer 16 serves as a phase reversing device to properly pole the biasing potential with respect to the plate voltage. The filament of tube 3 is heated from the secondary of transformer 16 through potentiometer 14 and resistor 15. The slidable contact of potentiometer 14 is adapted to adjust the normal grid voltage of tube 3 so that upon the cessation of the pulse received from the band-pass filter 2, tube 3 will automatically deionize.

Contacts 17 of impulse relay 4 are adapted to energize relay 36 whenever impulse relay 5 is operating in synchronism with relay 4. Reversible motor 27 receives an alternating current field magnetization through coil 26 and its armature 27' is adapted to rotate in a direction depending upon whether shading coil 24 or shading coil 25 is short-circuited. Whenever both coils are simultaneously short-circuited or whenever both coils are simultaneously opened the armature is stationary. Hence it will be observed that when impulse relays 4 and 5 operate synchronously, armature 27' remains stationary, but should impulse relay 4 operate more rapidly and begin closing ahead of relay 5, relay 36 will not be energized and contacts 19 and 20 will short-circuit coil 24 to cause armature 27' to move rack 28. A rheostat 29 is operatively associated with rack 28 to change the speed of motor 32 whereby impulse relay 5 is brought back into synchronism with impulse relay 4. An indicator 8 comprising a pointer 30 and scale 31 is also operatively associated with rack 28. Scale 31 is calibrated to read directly in pulses per second or pulses per minute. Motor 32 is of a type which maintains a relatively high degree of speed stability making for accurate indication. Although this motor is herein disclosed as operating from a direct current source, alternating current motors capable of variable speed operation are known to the art and may be substituted therefor without departing from the invention.

It is apparent that should impulse relay 4 slow down, impulse relay 5 will begin to operate ahead of it causing coil 25 of reversible motor 27 to become short-circuited through contacts 21 and 22 whereby armature 27' will rotate in a direction opposite to that previously described. Motor 32 will thereupon slow down until it has brought impulse relay 5 back in synchronism with impulse relay 4.

The shaft of motor 32 carries a cam 34 adapted to operate contact 33 which in turn operates impulse relay 5 from battery 35. The shaft of motor 32 is preferably driven at a reduced speed through a built-in gear reduction contained within the frame of motor 32.

From the above description it is evident that controller 6 will keep impulse relay 5 in synchronism with impulse relay 4 and will maintain this condition even for relatively rapid changes in pulse frequency received from the pick-up circuit 1. Moreover, it is evident that pointer 30 on rack 28 will continuously indicate the incoming pulse rate.

The type of pick-up detector which is used will depend upon the nature of the pulse energy received; for example, the microphone 9 of Fig. 1 illustrates that type which would be responsive to acoustic or mechanical pulses. Heart beat rates may be easily indicated by this type of pick-up and if necessary additional amplification may be inserted in the pick-up circuit by employing any of the amplifiers well-known in that art. Or if the pulse energy is in the form of a light beam, any convenient form of light sensitive pick-up circuit may be used in lieu of the specific microphone circuit illustrated.

For Fig. 2 the description for Fig. 1 is applicable except that the reversible motor 27 of Fig. 1 has been replaced by a single threaded screw 38 driven by an electromagnetic reversing clutch and gear assembly 37. In this figure the incoming pulse is indicated generally by an arrow directed toward the pick-up and translator unit 1 which is of any suitable form adapted to pick-up and translate the incoming energy pulse into an electric pulse. Filter 2, tube 3, relays 4, 5 and 36 and variable speed device 7 are all the same as in Fig. 1. Indicator 8, however, is here disclosed in the form of a recorder, point 30 being replaced by a stylus 30' and scale 31 by a record sheet 31' both of conventional form and requiring no further description.

Filter 2 may be dispensed with where extraneous disturbing pulses are absent or if the pick-up and translator unit 1 is itself selectively tuned to the desired band of incoming pulse frequencies.

What is claimed is:

1. A device for indicating the frequency of a low frequency source containing a plurality of other frequencies comprising filtering means for selecting the low frequency to be measured, an impulse generator the pulse frequency whereof is reponsive solely to said selected frequency, a variable speed driving means of high speed stability, a second impulse generator having a pulse frequency proportional solely to the speed of said variable speed means, a relay means for each of said generators adapted to respond independently and synchronously with the pulses generated by its associated generator, control means interconnecting said relay means adapted to control the speed of said variable speed driving means so that pulses therefrom are maintained in synchronism with the pulses from the first-named generator, and an indicator associated with said control means to indicate said selected frequency.

2. A heart-beat rate recorder comprising a pick-up means responsive to the heart beat for converting the beats into electric pulses, a variable speed motor of high speed stability, an interrupter associated therewith whose frequency is proportional to the speed of said motor, a calibrated speed controller for said motor capable of accurately controlling the speed thereof, a relay synchronously responsive to the pulses from the pick-up means, a second relay synchronously responsive to the frequency of the interrupter, a third relay responsive to the simultaneous operation of the first and second relays, control circuits including contacts on all three relays for adjusting the controller to maintain the frequency of the interrupter in synchronism with the said pulses and a recorder actuated by said controller to record the frequency of the heart beat.

3. A system for recording the frequency of a low frequency undulation comprising a first relay the operation whereof is synchronously responsive to said undulation, a variable speed motor, a second relay the speed of operation whereof is synchronously responsive to the speed of the motor, a third relay responsive to the simultaneous operation of the first and second relays, contacts for all three relays, a control circuit formed by contacts of the first relay and contacts of the third relay, a similar control circuit formed by additional contacts of the second and the third relays, a speed controller for accurately controlling the motor speed having a separate circuit portion included in each of said control circuits to render the controller responsive to current flowing in either of the control circuits whereby the motor speed is proportional to the frequency of the undulation, and a recorder actuated by said controller to record the frequency of the undulation.

CLARENCE A. LOVELL.